(12) United States Patent
Manji et al.

(10) Patent No.: US 10,667,464 B2
(45) Date of Patent: Jun. 2, 2020

(54) MOWER UNIT

(71) Applicant: Kubota Corporation, Osaka-shi (JP)

(72) Inventors: Yasuhiro Manji, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 275 days.

(21) Appl. No.: 15/800,286

(22) Filed: Nov. 1, 2017

(65) Prior Publication Data

US 2018/0338420 A1 Nov. 29, 2018

(30) Foreign Application Priority Data

May 24, 2017 (JP) .................. 2017-102821

(51) Int. Cl.
*A01D 69/00* (2006.01)
*A01D 34/78* (2006.01)
*A01D 34/66* (2006.01)
*A01D 34/64* (2006.01)
*A01D 34/81* (2006.01)

(52) U.S. Cl.
CPC .......... *A01D 34/78* (2013.01); *A01D 34/661* (2013.01); *A01D 34/64* (2013.01); *A01D 34/81* (2013.01); *A01D 2034/645* (2013.01)

(58) Field of Classification Search
USPC .......................................... 56/11.9
See application file for complete search history.

(56) References Cited

U.S. PATENT DOCUMENTS 6,484,484 B1 * 11/2002 Thomas ................. A01D 69/02
56/13.7

FOREIGN PATENT DOCUMENTS

JP 2013212006 A 10/2013

* cited by examiner

*Primary Examiner* — Thomas B Will
*Assistant Examiner* — Mai T Nguyen
(74) *Attorney, Agent, or Firm* — The Webb Law Firm

(57) ABSTRACT

Disclosed is a mower unit including, on a mower deck that rotatably supports a blade, a deck-side electric component configured to drive the blade, and a joint section for effecting connection and disconnection of a harness that electrically connects the deck-side electric component to a vehicle body-side electric component.

10 Claims, 4 Drawing Sheets

MOWER UNIT

CROSS-REFERENCE TO RELATED APPLICATION

This application claims priority to Japanese Patent Application No. 2017-102821 filed May 24, 2017, the disclosure of which is hereby incorporated in its entirety by reference.

BACKGROUND OF THE INVENTION

1. Field of the Invention

The present invention is directed to a mower unit mountable on a vehicle body.

2. Description of the Related Art

Such a mower unit is disclosed in JP2013-212006A, for example. The mower unit disclosed in JP2013-212006A includes a blade configured to be rotatably driven to cut grass on a ground surface (referred to as a "rotary blade" in JP2013-212006A), a mower deck that rotatably supports the blade, and a deck-side electric component for driving the blade. The deck-side electric component is configured to be electrically connected to a vehicle body-side electric component (an "inverter" in JP2013-212006A) associated with the vehicle body via a harness.

Incidentally, for the mower deck, a maintenance operation such as replacement of the blade is sometimes effected. In such a case, the mower deck is to dismount from the vehicle body. In this, there arises need to disconnect the deck-side electric component from the vehicle body-side electric component which are connected to each other via the harness.

However, with the conventional technique above, in many cases, it is designed such that connection and disconnection of the harness is to be effected at a location near the vehicle body-side electric component. As this vehicle body-side electric component is disposed at a relatively inaccessible location in the vehicle body, the harness connecting and disconnecting operations near the vehicle body-side electric component has tended to be troublesome. Further, as the harness is to be disconnected at such a location near the vehicle body-side electric component, a part of the harness would unnecessarily remain in the deck-side electric component, and such a harness part may sometimes provide hindrance to the maintenance operation.

In view of the above, there remains a need for a mower unit with improved readiness of maintenance.

SUMMARY OF THE INVENTION

In view of the above, there is proposed a mower unit configured as follows.

A mower unit comprising:

a blade configured to be rotatably driven to cut grass on a ground surface;

a mower deck that rotatably supports the blade;

a deck-side electric component associated with the mower deck and configured to drive the blade; and a joint section provided on the mower deck for effecting connection and disconnection of a harness that electrically connects the deck-side electric component to a vehicle body-side electric component associated with a vehicle body.

With the above arrangement, as the joint section for the harness which electrically connects the deck-side electric component to the vehicle body-side electric component is provided on the mower deck, this joint section is readily accessible, so that the harness connection and disconnection operations can be carried out easily. Further, when the harness is disconnected, no part of the harness will remain on the mower deck side, so that a maintenance operation of the mower deck for e.g. the blade can be carried out easily also. Therefore, with the above-described arrangement, it has become possible to configure a mower unit with improved maintenance readiness.

According to one preferred embodiment, the mower deck includes a housing that covers the blade; and the joint section is supported on the housing.

With the above arrangement, the housing can act also as a support for the joint section. Further, since an area on the housing is easy to access, the harness connection and disconnection operations at the joint section can be carried out easily.

According to one preferred embodiment, the joint section is provided with dust/water proof arrangement.

Mud, cut grass clipping, rainwater or the like is/are splashed over the mower deck during use, and cleaning water may be splashed over the same during a maintenance operation. With the above arrangement, however, the dust/water proof arrangement provided at the join section effectively suppresses occurrence of connection failure of the harness at the joint section.

According to one preferred embodiment, the deck-side electric component comprises an electric motor that rotatably drives the blade; and the vehicle body-side electric component comprises an inverter configured to vary a rotational speed of the electric motor.

With the above arrangement, the electric motor and the joint section are provided adjacent to the mower deck, and the inverter is provided adjacent to the vehicle body. So that, when the harness is disconnected, no part of the harness connected to the electric motor will remain, thus further facilitating a maintenance operation.

According to a further preferred embodiment, the deck-side electric component comprises an inverter configured to vary a rotational speed of an electric motor that rotatably drives the blade; and the vehicle body-side electric component comprises a battery that supplies electric power to the inverter.

With the above-described arrangement, the electric motor and the inverter are provided adjacent to the mower deck, and the battery is provided adjacent to the vehicle body. So that, when the harness is disconnected, no part of the harness connected to the inverter will remain, thus further facilitating a maintenance operation.

The invention relates also to a riding type grass mower vehicle having the above-described mower unit mounted on its vehicle body.

Further features and advantageous effects achieved thereby will become apparent upon reading the following description with reference to the accompanying drawings.

DETAILED DESCRIPTION OF PREFERRED EMBODIMENTS

Next, an embodiment of the present invention will be described with reference to the accompanying drawings. Incidentally, a direction denoted with an arrow sign "F" shown in FIG. 3 represents the "front" side, a direction denoted with an arrow sign "B" in FIG. 3 represents the "back (rear)" side, a direction with an arrow sign "L" in FIG. 3 represents the "left" side and a direction denoted with an arrow sign "R" represents the "right" side.

Figure 1:
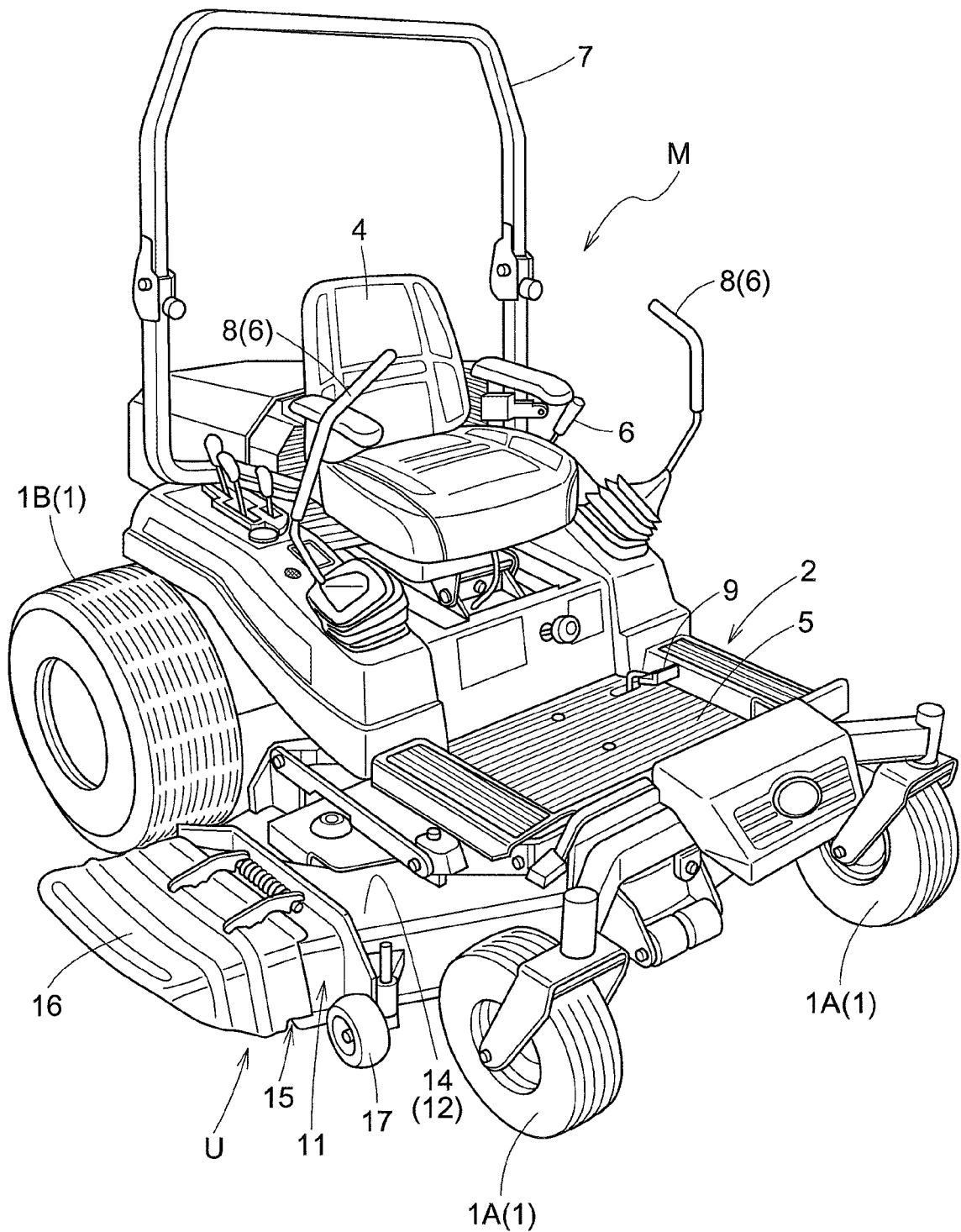
FIG. 1 is a perspective view of a mower unit and a riding type grass mower vehicle mounting such a mower unit, according to one embodiment.
Figure 2:
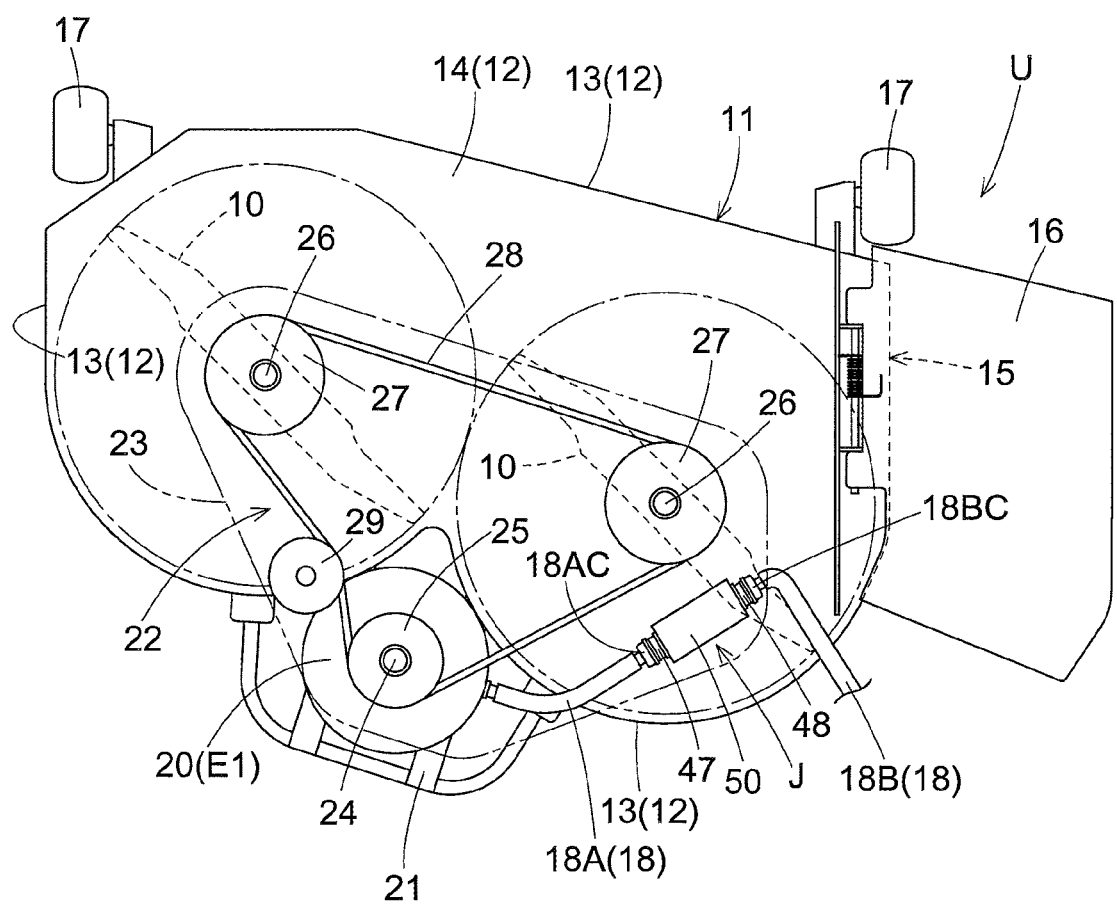
FIG. 2 is a top plan view of the mower unit.
Figure 3:
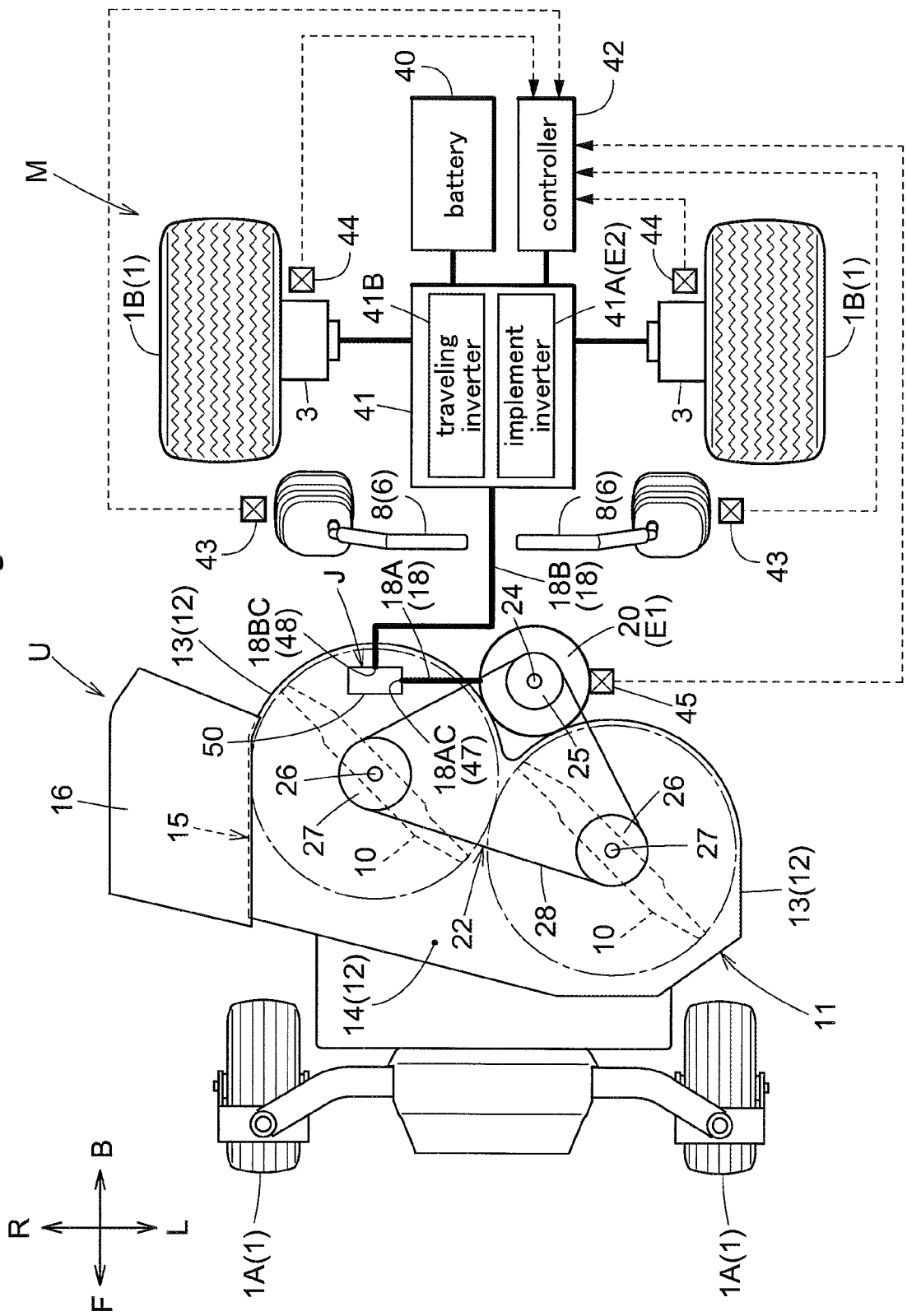
FIG. 3 is a schematic view showing the riding type grass mower vehicle mounting the mower unit as seen in their plan view.

A mower unit U shown in FIGS. 1-3 is mounted on a vehicle body M of a riding type grass mower vehicle. The riding type grass mower vehicle is configured to cut or mow grass on a ground surface in association with traveling of the vehicle body M.

As shown in FIG. 1 and FIG. 3, the vehicle body M includes a traveling device 1, and a main machine frame 2 in the form of a frame component supported on the traveling device 1. The traveling device 1 includes front wheels 1A comprised of a pair of right and left caster wheels and rear wheels 1B comprised of a pair of right and left drive wheels. The right and left rear wheels 1B can be driven independently of each other by electric traveling motors 3 (see FIG. 3) respectively corresponding thereto.

Further, as shown in FIG. 1, the vehicle body M includes a driver's seat 4 on which an operator can be seated, a floor panel 5 on which the operator's foot is placed, a control unit 6 operated by the operator, and a portal-shaped ROPS frame (roll-over protection structure frame) 7 mounted erect behind the driver's seat 4.

As shown in FIG. 1, the control unit 6 includes right and left maneuvering levers 8 configured to vary rotational speeds of the right and left traveling motors 3 for varying rotational speeds of the rear wheels 1B, respectively, a brake pedal 9 protruding from the floor panel 5 to be operable to brake the traveling device 1, and a drive switch (not shown) for operating or stopping the mower unit U, and so on.

As shown in FIG. 1, the mower unit U is disposed under the vehicle body M between the front wheels 1A and the rear wheels 1B, and suspended from a lower side of the vehicle body M to be adjustable in height via a lift link mechanism (not shown). As shown in FIG. 2, FIG. 3 and so on, the mower unit U includes a plurality of blades 10 (two blades 10 in the illustrated embodiment) rotatably driven to cut grass on the ground surface, and a mower deck 11 that rotatably supports the blades 10. The mower deck 11 includes a housing 12 designed to cover (shroud) the blades 10.

The housing 12 as shown in FIGS. 1-3 has an inner space for accommodating the respective blades 10. More particularly, the housing 12 includes a side wall portion 13 that covers at least a front side and a rear side of the respective blade 10, and a ceiling portion 14 that covers upper sides of the blades 10; and a lower side of the housing 12 is open. Further, either one right/left side of the side wall portion 13 of the housing 12 defines a cut grass discharge opening 15 for discharging cut grass clippings. To the cut grass discharge opening 15, there is attached a tubular discharge cover 16. The mower deck 11 includes a plurality of ground contacting wheels 17 to act as caster wheels.

As shown in FIG. 2 and FIG. 3, the mower unit U includes a deck-side electric component E1 for driving the blades 10. Further, as shown in FIG. 3, a vehicle body-side electric component E2 is provided in association with the vehicle body M. The deck-side electric component E1 and the vehicle body-side electric component E2 are to be electrically connected to each other via a harness 18 comprised of electric wiring (cables).

As shown in FIG. 2 and FIG. 3, in the instant embodiment, the deck-side electric component E1 is an electrically driven implement motor 20 (corresponding to an "electric motor") for rotatably driving the blades 10. Further, as shown in FIG. 3, in the instant embodiment, the vehicle body-side electric component E2 is an implement inverter 41A (corresponding to an "inverter") to be described later and configured to vary a rotational speed of the implement motor 20. The implement motor 20 is supported on a support deck 21 which is provided at a rear end portion of the mower deck 11. A mounting face of the support deck 21 for mounting the implement motor 20 is located lower than the ceiling portion 14 of the mower deck 11.

As shown in FIG. 2 and FIG. 3, the mower deck 11 mounts a power transmission mechanism 22 configured to transmit power from the implement motor 20 to the respective blades 10. The power transmission mechanism 22 is covered by a drive section cover 23 which is disposed on the upper side of the housing 12. The power transmission mechanism 22 includes an output pulley 25 rotatable in unison with an output shaft 24 of the implement motor 20, drive pulleys 27 rotatable in unison with rotary shafts 26 of the respective blades 10, a drive belt 28 wound around the output pulley 25 and the respective drive pulleys 27, and a tension pulley 29 (see FIG. 2) for applying a tension to the drive belt 28. In operation, when the implement motor 20 is driven, its rotatory power is transmitted to the rotary shafts 26 of the respective blades 10 via the output pulley 25 and the drive pulleys 27.

As shown in FIG. 3, the vehicle body M includes a battery 40 acting as a power source, an inverter section 41, and a controller 42 for effecting control of the inverter section 41. The inverter section 41 include an implement inverter 41A that supplies adjusted electric power to the implement motor 20, and a traveling inverter 41B that supplies adjusted electric power to each of the right and left traveling motors 3.

The traveling inverter 41B as shown in FIG. 3 is configured to output the adjusted electric power to each of the right and left traveling motors 3 such that rotational speeds of the right and left traveling motors 3 may be different from each other. Whereby, the vehicle body M can make a turn.

As shown in FIG. 2 and FIG. 3, the mower deck 11 includes a joint section J configured to effect connection and disconnection of a harness 18 which operably connects the implement motor 20 as the "deck-side electric component E1" to the implement inverter 41A as the "vehicle body-side electric component E2". The joint section J is disposed adjacent the implement motor 20. Further, the joint section J is supported on the housing 12. Specifically, the joint section J is supported on a top side of the ceiling portion 14 of the housing 12. Also, the joint section J is covered by the drive section cover 23 (see FIG. 2).

As shown in FIG. 3, the controller 42 is configured to receive information inputted from e.g. lever sensors 43 that detect pivotal operational amounts of the respective right and left maneuvering levers 8, traveling rotation sensors 44 that detect rotational speeds of the respective right and left traveling motors 3, an implement rotation sensor 45 that detects a rotational speed of the implement motor 20, etc. Then, based on the inputted information, the implement inverter 41A and the traveling inverter 41B will be controlled.

Electric power from the battery 40 as shown in FIG. 3 is supplied to the inverter section 41, the controller 42, etc. So that, adjusted electric power is supplied from the traveling inverter 41B of the inverter section 41 to each of the right and left traveling motors 3. Further, adjusted electric power is supplied from the implement inverter 41A of the inverter section 41 via the joint section J to the implement motor 20 that drives the blades 10.

As shown in FIG. 2 and FIG. 3, the harness 18 includes: a deck-side harness section 18A provided in association with the mower deck 11 of the mower unit U; and a vehicle body-side harness section 18B provided in association with the vehicle body M, across the joint section J therebetween. In response to establishment of connection between the deck-side harness section 18A and the vehicle body-side harness section 18B via the joint section J, electric connection is established between the deck-side electric component E1 and the vehicle body-side electric component E2 (see FIG. 3).

As shown in FIG. 2 and FIG. 3, the joint section J is formed integral with the mower deck 11. The joint section J includes a deck-side female connector 47, a vehicle body-side female connector 48 to be electrically connected with the deck-side female connector 47, and a joint case 50 configured to cover the wiring which interconnects the deck-side female connector 47 and the vehicle body-side female connector 48. The deck-side female connector 47 is disposed on a face (lateral side) of the joint case 50 associated with the implement motor 20. The vehicle body-side female connector 48 is disposed on a face (rear side) of the joint case 50 associated with the inverter section 41.

As shown in FIG. 2 and FIG. 3, a deck-side male connector 18AC of the deck-side harness section 18A is detachably connected to the deck-side female connector 47. Similarly, a vehicle body-side male connector 18BC of the vehicle body-side harness section 18B is detachably connected to the vehicle body-side female connector 48.

With insertion of the deck-side male connector 18AC into the deck-side female connector 47 as shown in FIG. 2 and FIG. 3, there is provided a condition that mud, cut grass clipping, rainwater, cleaning water etc. cannot enter the joint case 50 via the deck-side female connector 47. Further, with insertion of the vehicle body-side male connector 18BC into the vehicle body-side female connector 48, there is provided a condition that mud, cut grass clipping, rainwater, cleaning water etc. cannot enter the joint case 50 via the vehicle body-side female connector 48. Also, when the deck-side male connector 18AC is removed from the deck-side female connector 47 as shown in FIG. 2 and FIG. 3, a dummy male connector (not shown) will be attached to the deck-side female connector 47. Similarly, when the vehicle body-side male connector 18BC is removed from the vehicle body-side female connector 48, a dummy male connector (not shown) will be attached to the vehicle body-side female connector 48. With these arrangements, intrusion of mud, cut grass clipping, rainwater, cleaning water etc. to the interior of the joint case 50 is prevented. In this way, the joint section J is provided with dust/water proof arrangement.

With the above-described configuration, connecting and disconnecting operations between the deck-side electric component E1 and the vehicle body-side electric component E2 can be carried out easily at the joint section J which is provided on the mower unit U. With this, when e.g. replacement of the blade 10 is to be effected by dismounting the mower unit U from the vehicle body M, the harness 18 will not remain on the side of the mower deck 11 unnecessarily, so that readiness of maintenance of the mower unit U is improved.

Other Embodiments

Next, other embodiments with modifications from the foregoing embodiment will be described. It is to be understood that the following embodiments can be applied in any desired combination with the foregoing embodiment as long as no contradiction occurs. Also, it is to be understood that the scope of the present invention is not to be limited to the contents disclosed in the embodiments.

(1) In the foregoing embodiment, the implement inverter 41A is provided in association with or adjacent to the vehicle body M, but this is not limitative.

Figure 4:
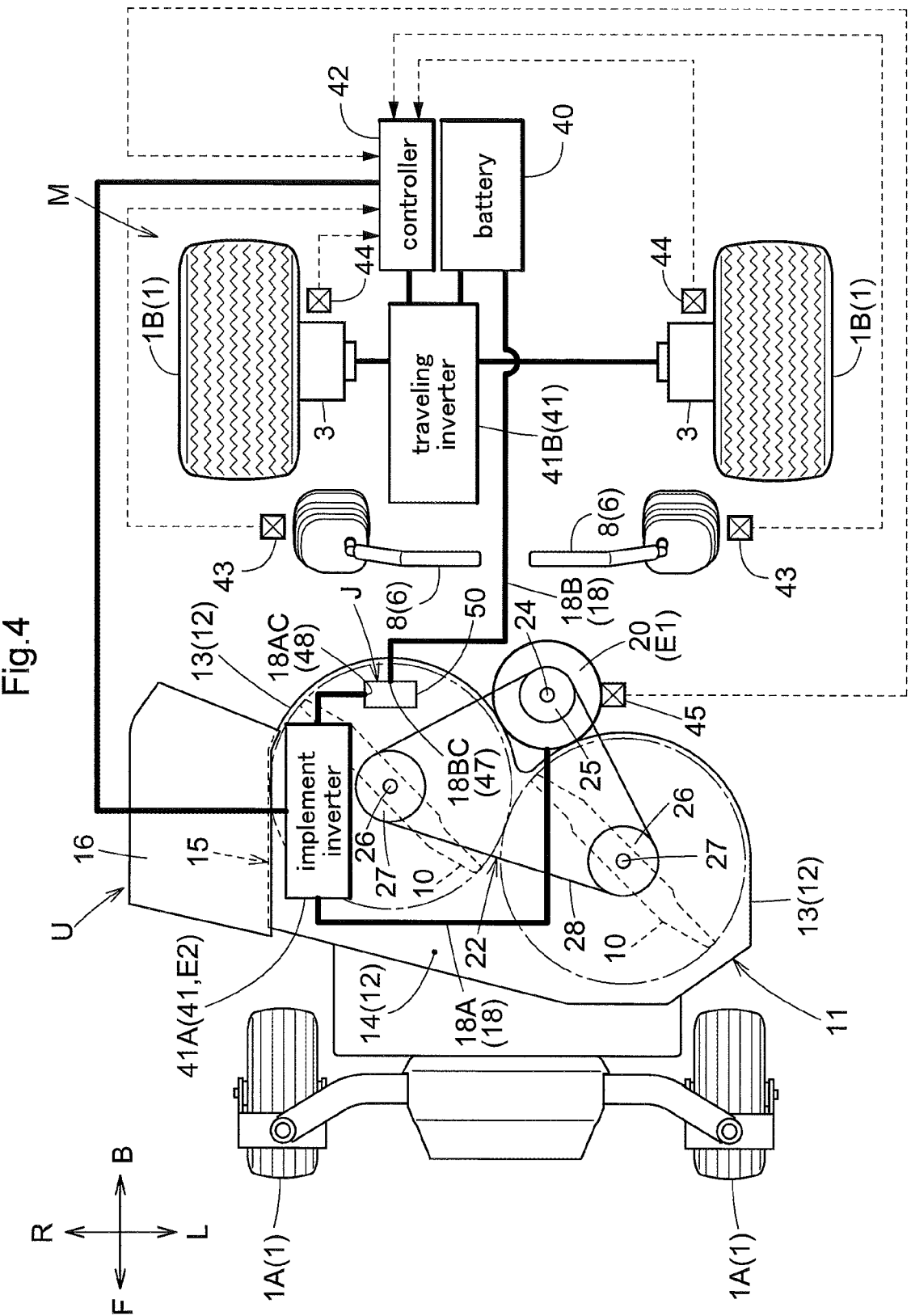
FIG. 4 is a schematic view showing a riding type grass mower vehicle mounting a mower unit according to a modified embodiment as seen in their plan view.

As shown in FIG. 4, for instance, the implement inverter 41A may be provided in association with or adjacent to the mower unit U. In the modified embodiment, the implement inverter 41A and the traveling inverter 41B of the inverter section J will be provided in distribution to the mower unit U and the vehicle body M, respectively. Namely, in the modified embodiment, the deck-side electric component E1 will correspond to the implement inverter 41A (corresponding to the "inverter") configured to vary a rotational speed of the implement motor 20 for rotatably driving the blades 10, and the vehicle body-side electric component E2 will correspond to the battery 40 for supplying electric power to the implement inverter 41A.

(2) In the foregoing embodiment, the arrangement includes two blades 10, but this is not limitative. The number of blade(s) 10 can be one and only, three (3) or more.

(3) In the foregoing embodiment, the vehicle body-side electric component E2 comprises the implement inverter 41A and the battery 40, but this is not limitative. For instance, any other electric device(s) such as the controller 42, a bus bar, etc. can constitute the vehicle body-side electric component E2.

(4) In the foregoing embodiment, the deck-side electric component E1 comprises the implement motor 20 and the implement inverter 41A, but this is not limitative. For instance, any other electric device(s) such as the controller 42, a bus bar, etc. can constitute the deck-side electric component E1.

(5) In the foregoing embodiment, the deck-side harness section 18A is detachably attached to the joint case 50, but this is not limitative. For instance, the deck-side harness section 18A can be made non-detachably attached to the joint case 50.

(6) In the foregoing embodiment, the joint section J is covered by the drive section cover 23, but this is not limitative. For instance, there may be a modified arrangement in which the joint section J is not covered by the drive section cover 23.

(7) In the foregoing embodiment, the single implement motor 20 drives all of the plurality of blades 10, but this is not limitative. For instance, a plurality of implement motors 20 corresponding in number to the number of the blades 10 may be provided, with each implement motor 20 driving a single blade 10 corresponding thereto.

(8) In the foregoing embodiment, the traveling device 1 is driven by the traveling motors 3, but this is not limitative. For instance, an engine may be mounted on the vehicle body M, so that the traveling device 1 will be driven by power of such an engine.

What is claimed is:

1. A mower unit comprising:
   a blade configured to be rotatably driven to cut grass on a ground surface;
   a mower deck that rotatably supports the blade;
   a deck-side electric component associated with the mower deck and configured to drive the blade; and
   a joint section provided on the mower deck for effecting connection and disconnection of a harness that electrically connects the deck-side electric component to a vehicle body-side electric component associated with a vehicle body,
   wherein the joint section comprises an elongated element having a deck-side connector at one longitudinal end thereof and a vehicle body-side connector at the other longitudinal end thereof, the connection and disconnection of the harness associated with the deck-side electric component being effected at the deck-side connector, and the connection and disconnection of the harness associated with the vehicle body-side electric component being effected at the vehicle body-side connector.

2. The mower unit of claim 1, wherein:
   the mower deck includes a housing that covers the blade; and
   the joint section is supported on the housing.

3. The mower unit of claim 1, wherein the joint section is provided with dust/water proof arrangement.

4. The mower unit of claim 1, wherein:
   the deck-side electric component comprises an electric motor that rotatably drives the blade; and
   the vehicle body-side electric component comprises an inverter configured to vary a rotational speed of the electric motor.

5. The mower unit of claim 1, wherein:
   the deck-side electric component comprises an inverter configured to vary a rotational speed of an electric motor that rotatably drives the blade; and
   the vehicle body-side electric component comprises a battery that supplies electric power to the inverter.

6. A riding type grass mower vehicle including a vehicle body and a mower unit mounted on the vehicle body, wherein the mower unit comprises:
   a blade configured to be rotatably driven to cut grass on a ground surface;
   a mower deck that rotatably supports the blade;
   a deck-side electric component associated with the mower deck and configured to drive the blade; and
   a joint section provided on the mower deck for effecting connection and disconnection of a harness that electrically connects the deck-side electric component to a vehicle body-side electric component associated with a vehicle body,
   wherein the joint section comprises an elongated element having a deck-side connector at one longitudinal end thereof and a vehicle body-side connector at the other longitudinal end thereof, the connection and disconnection of the harness associated with the deck-side electric component being effected at the deck-side connector, and the connection and disconnection of the harness associated with the vehicle body-side electric component being effected at the vehicle body-side connector.

7. The riding type grass mower vehicle of claim 6, wherein:
   the mower deck includes a housing that covers the blade; and
   the joint section is supported on the housing.

8. The riding type grass mower vehicle of claim 6, wherein the joint section is provided with dust/water proof arrangement.

9. The riding type grass mower vehicle of claim 6, wherein:
   the deck-side electric component comprises an electric motor that rotatably drives the blade; and
   the vehicle body-side electric component comprises an inverter configured to vary a rotational speed of the electric motor.

10. The riding type grass mower vehicle of claim 6, wherein:
    the deck-side electric component comprises an inverter configured to vary a rotational speed of an electric motor that rotatably drives the blade; and
    the vehicle body-side electric component comprises a battery that supplies electric power to the inverter.

* * * * *